United States Patent

Riegler et al.

[11] 3,897,120
[45] July 29, 1975

[54] TILTABLE CONVERTER SELF-ALIGNING BEARING

[75] Inventors: Ernst Riegler, Enns; Manfred Schmidt, Linz, both of Austria

[73] Assignee: Vereinigte Osterreichische Eisen- und Stahlwerke - Alpine Montan Aktiengesellschaft, Linz, Austria

[22] Filed: Oct. 31, 1973

[21] Appl. No.: 411,456

[30] Foreign Application Priority Data
Jan. 30, 1973 Austria .............................. 777/73

[52] U.S. Cl. ................. 308/36.1; 308/72; 308/176
[51] Int. Cl. ...... F16c 1/24; F16c 23/04; F16c 33/72
[58] Field of Search ............... 105/9, 15, 36.1, 36.3, 105/72, 73, 77, 78; 308/5, 36.1, 72, 176

[56] References Cited
UNITED STATES PATENTS

| | | | |
|---|---|---|---|
| 2,149,712 | 3/1939 | Wallgren | 308/73 |
| 3,427,081 | 2/1969 | Dellinger | 308/15 |
| 3,523,714 | 8/1970 | Puhringer | 308/5 |
| 3,588,201 | 6/1971 | Schmidt | 308/36.1 |

FOREIGN PATENTS OR APPLICATIONS

| | | | |
|---|---|---|---|
| 274,870 | 10/1969 | Austria | 308/36.1 |
| 293,808 | 10/1971 | Austria | 308/36.1 |
| 1,250,399 | 10/1971 | United Kingdom | 308/36.1 |

*Primary Examiner*—M. Henson Wood, Jr.
*Assistant Examiner*—Howard Beltran
*Attorney, Agent, or Firm*—Brumbaugh, Graves, Donohue & Raymond

[57] ABSTRACT

A bearing construction for carrying trunnions of a tiltable converter comprising a bearing capable of absorbing angular (sagging) and drunken (wobbling) movements and fixed in position by means of two spacer rings which are each secured to the carrying trunnion on the sides of the inner ring of said bearing. At least one of said two spacer rings is made of three parts, namely of two spacer ring parts apposed to the inner ring of the bearing and to the carrying trunnion to be opposed to each other with play, and of a ring surrounding said two spacer ring parts closely. The inner faces of the spacer ring parts have the shape of a truncated cone and coact with the surface of the carrying trunnion which likewise has the shape of a truncated cone whose corresponding inclination extends inwardly towards the bearing centre.

7 Claims, 7 Drawing Figures

PATENTED JUL 29 1975 3,897,120

SHEET 1

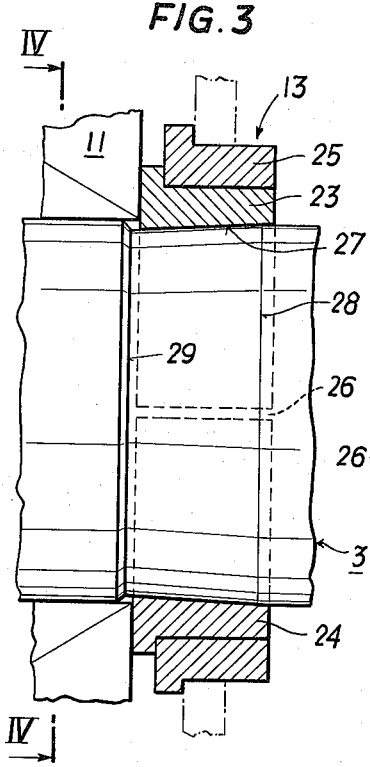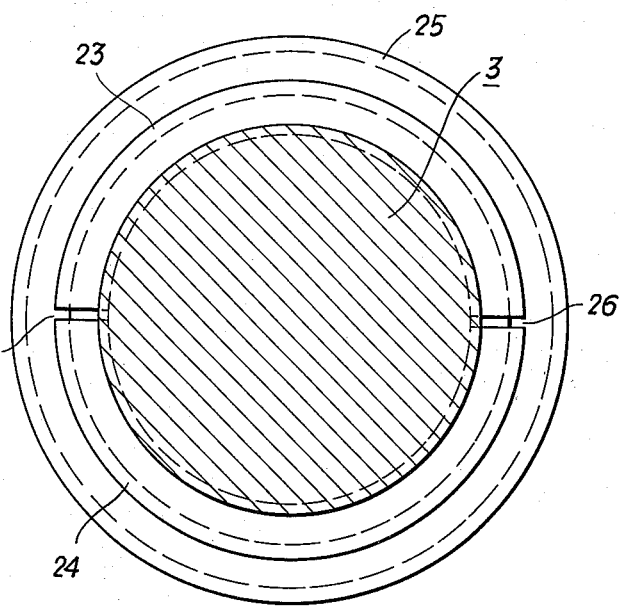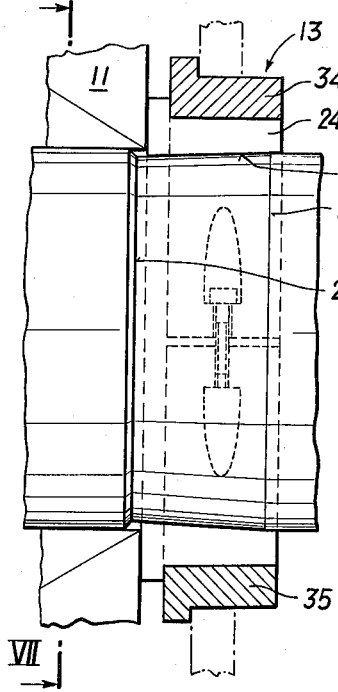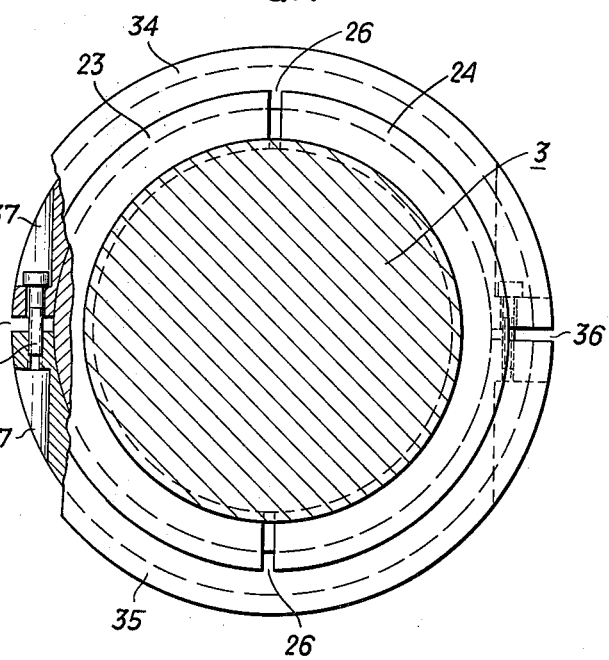

TILTABLE CONVERTER SELF-ALIGNING BEARING

The invention relates to a bearing construction for carrying trunnions of a tiltable converter comprising a bearing capable of absorbing angular (sagging) and drunken (wobbling) movements and fixed in position by means of spacer rings secured to the carrying trunnion on both sides of its inner ring and annular sealing means of plastic material, rubber and the like for sealing the bearing housing. It should be noted that in the specification and in the appended claims, the term bearing is meant to refer to slide-articulation or roller bearings.

Converter bearings which have to accommodate loads of e.g. 600 to 1000 mt (metric tons) must be constructed with great care. A satisfactory bearing construction which, when the carrying trunnions are positioned obliquely owing to the influence of heat, can also take up angular and drunken (wobbling) movements, and in which one of the bearings is designed as movable bearing for accommodating an axial displacement of the carrying trunnion and the other bearing is designed as fixed bearing is described in Austrian Pat. No. 274,870. The carrying trunnions, which are secured to the carrying ring on which the converter is supported, have a relatively great diameter. According to the load to be received, the diameter lies between 700 and 1000 mm and may be even greater. Although converter bearings have only a small number of revolutions of about 1 rpm, highest demands are placed on them owing to the specific operational conditions when they are exposed to heat and dust, in particular with regard to their operational safety. When the bearings cease to function, the whole steel production comes to a standstill. Moreover it is very difficult and expensive to exchange a bearing.

According to Austrian Pat. No. 293,808 a trunnion seat has become known which is composed of a sealing line inserted into a groove surrounding the trunnion. The groove is formed of two section rings which may be drawn towards each other in an axial direction, and these section rings together with the sealing line are radially displaceable within an annular recess of the bearing housing or a bearing cover, respectively, so that even when the carrying trunnion makes a drunken movement the sealing effect is maintained. Although the considerations were correct on which this construction is based, operational practice has shown that the life of the sealing is insufficient. When the trunnion is positioned obliquely, the sealing line is greatly distorted owing to the radial sliding movement in the bearing housing. The sealing material is stressed thereby to more than its elastic limit so that its elastical properties gradually are lost. In the course of time, the bearing inner space will then be "opened up" so that entering dirt, solid slag, iron or other particles will soon damage the bearing.

Another problem presents itself with regard to fixing the slide-articulation or roller bearing in position on the carrying trunnion by means of the spacer rings. Until now, for supporting at least one of the spacer rings a relatively deep groove-like recess has been provided in the carrying trunnion into which a holding ring has been fitted for abutment of the spacer ring. The groove-like recess has a notch-effect so that the carrying trunnion has to be designed to be excessively thick and heavy. This obviously makes for an increase in the costs of the total bearing construction.

The invention is aimed at creating an improved bearing construction which permits the use of bearings and carrying trunnions with smaller diameters so that production and mounting is simplified. In addition the invention is aimed at improving the sealing of the bearing housing so that the elastic sealing is not pressed together in radial direction as a result of a drunken (wobbling) movement of the carrying trunnion, and its life is prolonged.

In a bearing construction of the kind defined in the introduction, the invention resides in that at least one of the two spacer rings is made of three parts, i.e., of two spacer ring parts which are apposed to the inner ring of the slide-articulation or roller bearing and to the carrying trunnion and are opposed to each other with play, and a ring which surrounds them closely, the inner faces of these spacer ring parts being truncated-cone-shaped and coacting with the carrying trunnion having an inwardly truncated cone-shaped surface area with a corresponding inclination.

The inclination angle of the truncated cone-shaped surface area to the carrying trunnion axis preferably amounts to 2° to 4°.

According to one embodiment of the invention, the spacer ring parts, which are designed to be about semi-circular, may be rigidly surrounded by providing them with a cylindrical surface upon which surface the ring surrounding them is shrinked on in warm condition, or by designing the ring surrounding the spacer ring parts of two parts which are opposed to each other with a play and may be tightened towards each other by means of screws.

According to the invention, the bearing is sealed in that between the spacer rings and lateral, annular covers of the bearing housing spherical sealing faces are arranged with sealings arranged in between in annular recesses, the common central point of the spherical sealing faces being in the central point of the slide-articulation or roller bearing.

The combination of the novel arrangement for securing the spacer rings with the novel kind of sealing offers a particularly safe bearing construction for the requirements in steel working operation. This bearing construction is advantageously designed as fixed bearing. It may, however, be applied for movable bearings, in which case the total bearing construction must in addition be displaceable in axial direction of the carrying trunnions, e.g. by abutment on a roller path or by mounting the bearing on a pendulum support.

In order that the construction according to the invention may be more fully understood, embodiments thereof shall now be explained with reference to the accompanying drawings.

FIG. 3 shows in enlarged scale a longitudinal sectional view of the securing arrangement of the spacer ring, and FIG. 4 shows a vertical sectional view along the line IV—IV of FIG. 3.

FIGS. 6 and 7 show modified embodiments in similar representations as FIGS. 3 and 4.

Figure 1:
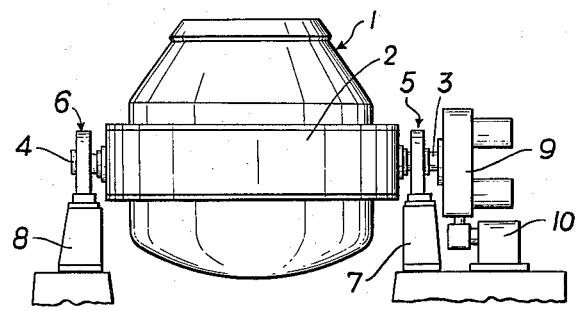
FIG. 1 is a lateral view of a converter plant with its drive.

In FIG. 1, numeral 1 denotes a converter which is surrounded by a carrying ring 2 and tiltably supported by means of carrying trunnions 3,4 in a fixed bearing 5 and a movable bearing 6. The fixed bearing 5 and the movable bearing 6 are mounted on stanchions 7 and 8. On the fixed bearing side, a slip-on-drive 9 for tilting the converter 1 is fixed on the carrying trunnion 3, which is fixed by a torque support 10 in circumferential direction.

Figure 2:
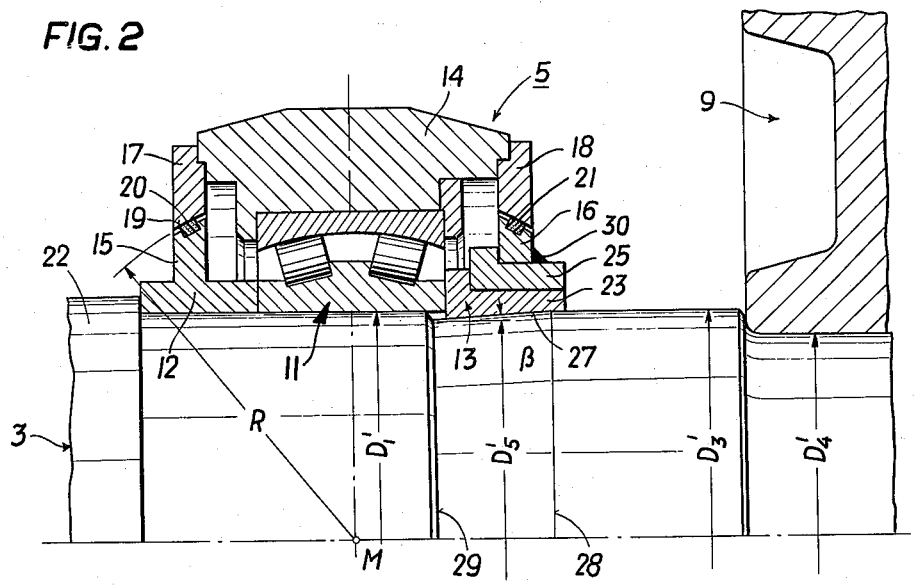
FIG. 2 is a longitudinal sectional view of a bearing construction on the fixed bearing side.

In FIG. 2, numeral 11 denotes a self-aligning roller bearing. It may also be a slide-articulation bearing or a barrel bearing, taper roller bearing or the like, as described e.g. in the German utility model No. 7,139,476 or in previously mentioned Austrian Pat. No. 274,870. These bearings comprise an inner ring which is secured to the carrying trunnion, and an outer ring which is fixed in the bearing housing. Between inner ring and outer ring the slide or roller bodies are arranged which render it possible for the bearing to take up angular and drunken movements. If such a bearing is designed as a movable bearing, it also has to accommodate axial movements. Thus, either its outer ring may be mounted in a slide bushing which is displaceable relative to the fixed bearing housing (cf. Austrian Pat. No. 274,870) or the entire bearing construction may be displaceable in a horizontal direction.

The inner ring of the bearing 11 is fixed in position by two spacer rings 12,13. The outer ring is fixed in a housing cover 14, which is releasably connected with a bearing foot, not shown. According to the invention, between the flange-like studs 15,16 of the spacer rings 12,13 and the lateral housing covers 17,18, spherical sealing faces 19 are provided with annular sealings of plastic material, rubber or the like which are inserted in corresponding recesses. These sealings 20,21 may e.g. be O-rings which are able to withstand operational temperatures of up to about 150°C. The spherical sealing faces 19 with the radius R have a common central point M which coincides with the central point of the roller bearing 11. When the carrying trunnion 3 assumes an oblique position (in practice, angular deviations of ± 1° will occur) the spacer rings 12,13 with their flange-shaped studs 15,16 and the sealings 20,21 may be displaced relative to the lateral housing covers 17,18. During this slewing movement, the elastic sealings 20,21 are not subjected to any additional pressure strain in a radial direction. The spherical faces 19 are dimensioned sufficiently broad that corresponding to the angular deviation in any oblique position, the sealing effect between the studs 15,16 and the housing covers 17,18 remains intact and no dirt may enter into the bearing interior. The sealings 20,21 are subjected only to a tangential stress so that their life is essentially increased. When necessary they may easily be exchanged after releasing the housing covers 17,18.

In detail, according to the invention, the bearing inner ring is fixed in position by the left spacer ring 12, which is apposed to the collar 22 of the carrying trunnion 3, and by the right spacer ring 13, which in its turn is composed of the parts 23,24 and 25. The parts 23,24 are the spacer ring parts proper, which are rigidly apposed to the inner ring of the bearing 11, on the one hand, and to the bearing trunnion 3, on the other hand.

As may be derived from FIGS. 3 and 4, the parts 23,24 are about semicircular. They are opposed to each other and lie around the bearing trunnion 3 with play 26 and have an L-shaped cross section. The ring 25 consists of one part and is shrunk on in hot condition. It surrounds the semicircular parts 23,24 and holds them closely together. The inner faces of the semicircular parts 23,24 have the shape of a truncated cone and coact with the surface 27 of the carrying trunnion having the shape of a truncated cone with a corresponding inclination. The inclination extends from the outside to the interior, i.e., the trunnion radius 28 situated more to the outside is greater than the radius 29 situated more to the inside. The inclination angle of the surface 27 having the shape of a truncated cone to the carrying trunnion axis is denoted with $\beta$ and amounts to about 4°. Owing to this formation, the spacer ring parts 23,24 are self-lockingly secured to the carrying trunnion. When the ring 25 composed of one part which is mounted in hot condition, e.g. at a temperature of about 100°, has cooled down, the spacer ring parts 23,24 are safely fixed to be indisplaceable in axial direction, and the roller bearing 11 is excellently fixed in axial direction. An axial thrust created by this bearing 11 is absorbed by the surface 27 having a truncated cone shape or by the ring 25, respectively. The ring 25 is likewise designed to be L-shaped. It is connected with the annular stud 16, e.g. by a welding seam 30.

Figure 5:
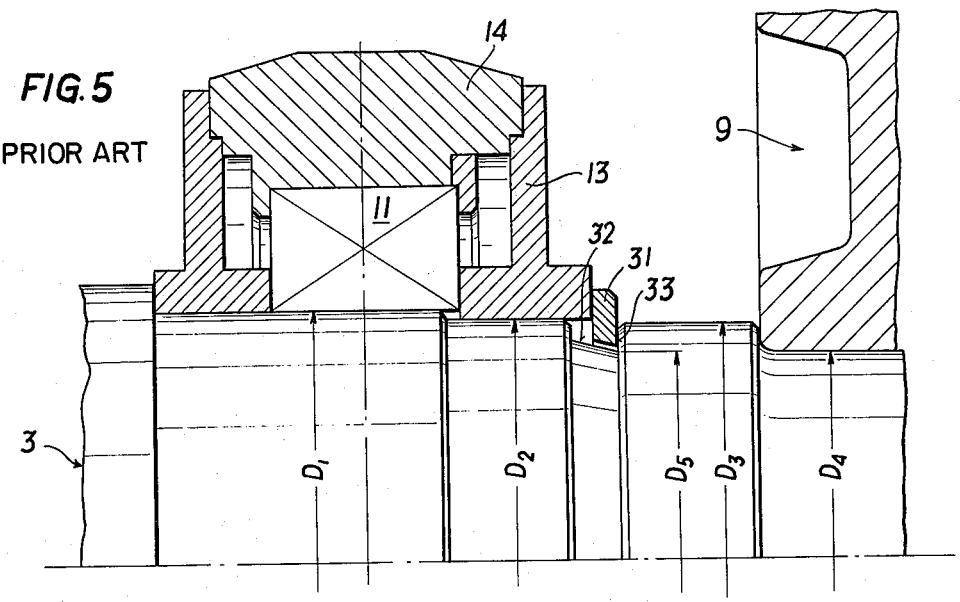
FIG. 5 shows a securing arrangement for a spacer ring as known in the art in the same representation and in the same scale as FIG. 2, and is to facilitate comparison on the one hand and should serve for a better understanding of the invention on the other hand.

By way of comparison, FIG. 5 shows a spacer ring fixation of customary type. In this case, the right spacer ring 13 is designed in one part and supports itself against a further holding ring 31 which is designed in two parts in circumferential direction. The holding ring 31 is fitted in a groove-shaped recess 32 and abuts against the shoulder-shaped stud 33 of the carrying trunnion. The holding ring 31 is fixed to the spacer ring 13 by means of screws. The disadvantage arising from this known way of securing the spacer ring to the trunnion lies in the fact that the groove shaped recess has to be relatively deep and thus the trunnion is weakened. If, e.g. the trunnion diameter $D_1$ amounts to 1000 mm in the bearing area, the diameter $D_2$ amounts to 970 mm in the area of the spacer ring, the diameter $D_3$ amounts to 960 mm outside the bearing 5 and the diameter $D_4$ to 800 mm in the area of the slip-on-drive, the diameter $D_5$ amounts thus to 820 mm at the deepest place of the groove-shaped recess. The difference $D_3-D_5$ thus amounts to 140 mm; owing to this deep incision a notch effect will be obtained so that when the tensions in the carrying trunnion 3 are calculated, it becomes necessary to add a sufficiently great safety margin for the remaining trunnion diameters. In the present example, the difference $D_1-D_5 = 180$ mm. This means that in dimensioning the carrying trunnions until now, one had to start from the weakest diameter $D_5$ in the recess 32 so that the overall bearing construction became greater, heavier and considerably more expensive than in a carrying trunnion in which only the total weight of the converter 1 and the drive movement (torque) has to be considered for dimensioning.

The advantages achieved according to the invention become apparent by a comparison with FIG. 2 which is drawn in the same scale. One can see that with the same load, i.e., with the same total weight and the same torque, by the securing arrangement of the spacer rings according to the invention, it is possible to keep the diameter $D_1'$ which determines the dimensioning of the total bearing construction 5 essentially smaller, e.g. $D_1'$ can be reduced by 20 percent to 800 mm. $D_3'$ then amounts to 798 mm, and $D_4'$ amounts to 770 mm. $D_5'$ is smaller than $D_1'$ only by 10 mm, or smaller than $D_3'$ by 8 mm, and amounts thus to 790 mm. Working of the carrying trunnion is finished one working step earlier. There is no disadvantageous notch effect present so that when the carrying trunnion and the bearing construction are dimensioned, one has to take into consideration only the load of the total weight and the torque. One thus obtains an optimum bearing construction. When the bearing is exchanged, only the seam 30 is opened, while the ring 25 is cut up and replaced by a new one. Such a ring is cheap and may easily be produced.

FIGS. 6 and 7 illustrate a modified embodiment of the invention. In this case, a securing ring is provided which comprises the ring parts 34,35, which are opposed to each other with play 36. By means of screws 38 which are inserted in recesses 37, they may be tightened to the spacer ring parts 23,24. Thus, they may be re-used after an exchange of bearing. After mounting, all joints present owing to the play 26 or 36, respectively, are sealed in axial direction by pressing in a further sealing means, e.g. a string of asbestos.

What is claimed is:

1. A support arrangement for a tiltable converter comprising a plurality of trunnions secured to the converter and a plurality of bearing assemblies that mount and support the trunnions, each bearing assembly mounting a different trunnion and at least one of the bearing assemblies including:
   a. a bearing adapted to accommodate angular and wobbling movements of one of the trunnions and having an inner ring encircling said one trunnion and an outer ring encircling the inner ring;
   b. two spacer ring assemblies encircling said one trunnion and located adjacent different ends of the inner ring of the bearing to maintain the inner ring in position axially of said one trunnion;
   c. a bearing housing encircling the bearing and including annular portions that depend radially inwardly adjacent each end of the bearing; and
   d. annular resilient means for sealing the bearing housing,
   at least one of the spacer ring assemblies including:
   i. two arcuate spacer ring parts that have complementary circumferential extents and are juxtaposed with the inner ring of the bearing and with said one trunnion, the two spacer ring parts being disposed opposite each other about said one trunnion so that adjacent ends of the two spacer ring parts are spaced apart circumferentially of said one trunnion from each other, and
   ii. a retaining ring that closely encircles the two spacer ring parts, the outer circumferential surface of said one trunnion in a region adjacent said spacer ring parts having a conical shape and the inner circumferential surfaces of the spacer ring parts having complementary, conical shapes so that the conical surfaces of the spacer ring parts cooperate with the conical surface of said one trunnion to maintain said at least one spacer ring assembly in position axially of said one trunnion.

2. A support arrangement according to claim 1, wherein the sealing means is fabricated of rubber.

3. A support arrangement according to claim 1, wherein the sealing means is fabricated of plastic material.

4. A support arrangement according to claim 1, wherein each spacer ring part has an outer surface shaped as portion of a cylinder and wherein the retaining ring is shrink fitted onto the spacer ring parts.

5. A support arrangement according to claim 1, wherein the retaining ring comprises (a) two separable parts which have complementary circumferential extents and which are disposed opposite each other about said one trunnion so that adjacent ends of said retaining ring parts are spaced apart circumferentially of said one trunnion from each other, and (b) screw means for coupling said parts of the retaining ring together and for tightening the fit of said two parts of the retaining ring about the two spacer ring parts.

6. A support arrangement according to claim 1, wherein the spacer ring assemblies and the depending portions of the bearing housing have complementary spherical sealing surfaces, all of which surfaces being generated from a common center point that is located adjacent the center of the bearing, and wherein the sealing means including two annular seal members disposed in annular recesses that are formed at least one in a spherical sealing surface adjacent each end of the bearing so that the seal members seal joints defined at interfaces between the spherical surfaces of the depending housing portions and of the spacer ring assemblies.

7. A support arrangement for a tiltable converter comprising a plurality of trunnions secured to the converter and a plurality of bearing assemblies that mount and support the trunnions, each bearing assembly mounting a different trunnion and at least one of the bearing assemblies including:
   a. a bearing adapted to accommodate angular and wobbling movements of one of the trunnions and having an inner ring encircling said one trunnion; and
   b. two spacer ring assemblies encircling said one trunnion and located adjacent different ends of the inner ring of the bearing to maintain the inner ring in position axially of said one trunnion, at least one of the spacer ring assemblies including:
   i. two arcuate ring parts that have complementary circumferential extents and that are juxtaposed with the inner ring of the bearing and with said one trunnion, the two spacer ring parts being disposed opposite each other about said one trunnion so that adjacent ends of the two spacer ring parts are spaced apart relatively small distances circumferentially of said one trunnion from each other; and
   ii. a retaining ring that closely encircles both spacer ring parts;
   the outer circumferential surface of said one trunnion in a region adjacent the spacer ring parts having a conical shape and the inner circumferential surfaces of the spacer ring parts having complementary, conical shapes so that the conical surfaces of the spacer ring parts cooperate with the conical surface of said one trunnion to maintain said at least one spacer ring assembly in position axially of said one trunnion.

* * * * *